Dec. 24, 1935.                F. E. STAHL                 2,025,557
                            CHAIN LINK BLANK
                           Filed Sept. 1, 1934
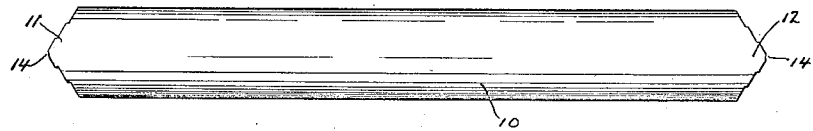
Fig. 1.
Fig. 2.
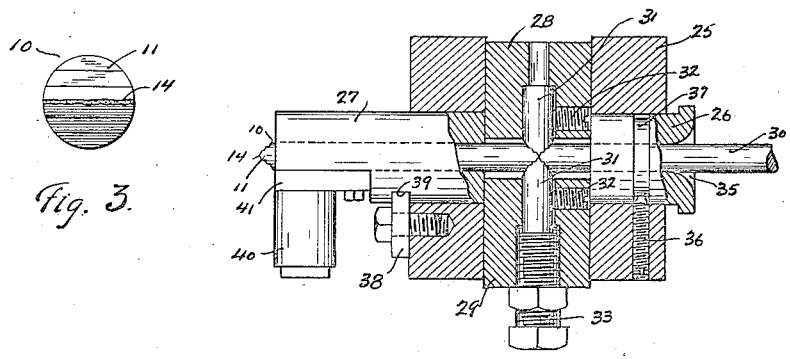
Fig. 3.
Fig. 5.
Fig. 4.
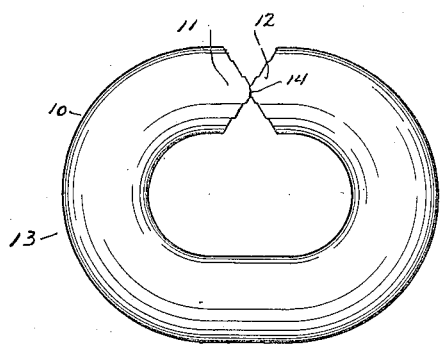
Fig. 6.
INVENTOR
FRANK E. STAHL
By J.W. Ellis
ATTORNEY Patented Dec. 24, 1935

2,025,557

UNITED STATES PATENT OFFICE 2,025,557

CHAIN LINK BLANK

Frank E. Stahl, Tonawanda, N. Y., assignor to Columbus McKinnon Chain Corporation, Tonawanda, N. Y., a corporation of New York Application September 1, 1934, Serial No. 742,416

2 Claims. (Cl. 59—35)

My invention relates in general to chains, and in particular to a blank for the links of chains, having novel ends and designed to be welded on a butt welding machine after being formed on a chain former.

It is well known to those skilled in the art that when welding a chain link having the ordinary flat, substantially parallel faces, gas pockets are sometimes formed and foreign matter is entrapped in the weld so that the strength of the link at the welded joint is dangerously reduced. This is particularly true in links made from the larger size wire or rods, and also is it true in the use of high carbon or alloy steels, such as those containing nickel, molybdenum, chrome, or manganese. In the use of such steels there is a very limited tolerance in the welding temperature, and this temperature must, therefore, be kept within narrow limits in order to produce a perfect weld.

I have discovered that if the blank is formed with V-shaped ends, or with ends so shaped that the cross-sectional area of each is gradually reduced from the body part of the blank to the extreme tip of the end, such tip being so formed that it lies substantially in the same plane as the central axis of the blank, the welding will occur from the central contacting welding area of the ends of the joint and such area will increase, spreading outwardly until the entire area of the blank is welded, thus preventing the formation of air or gas pockets and producing a weld which is substantially perfect.

The principal object of my invention has been, therefore, to provide a blank having similarly shaped ends, which, when formed in a chain former and brought together, will weld from the center outwardly.

Another object has been to provide a chain link blank having V-shaped ends formed so as to lie in substantially the same plane, and so that when the blank is formed in the shape of a link, the edges of the V-shaped ends will lie in juxtaposition.

Another object has been to provide a chain link blank, having all of the above mentioned characteristics, which may be conveniently produced on the usual chain forming machine.

The above objects and advantages have been accomplished by the device shown in the accompanying drawing, of which:

Fig. 1 is a side elevation of one form of my chain link blank.

Fig. 2 is a similar view of a modified form of blank.

Fig. 3 is an end view of the blank of Fig. 1.

Fig. 4 is a similar view of the blank of Fig. 2.

Fig. 5 is a fragmentary, sectional, plan view of one form of apparatus for producing my chain link blank.

Fig. 6 is a side elevation of a chain link formed from one of my link blanks and before the link is welded.

This application is a continuation in part of application Ser. No. 684,684, filed August 11, 1933 upon a Chain link blank and apparatus for forming the same and issued as Patent No. 1,994,794 on March 19, 1935.

As shown in Figs. 1 and 3, my link blank 10 is provided with ends 11 and 12 which are substantially V-shaped in formation. The blank has its ends 11 and 12 so formed that the edges 14 thereof lie in substantially the same plane, which plane is substantially coincident with the central axis of the blank. Furthermore, the blank is so positioned when being bent in the form of a link that the edges will lie in a plane substantially at right angles to a plane passing through or substantially parallel to the side surface of the link. By making the ends of the link blank V-shaped, the cross-sectional area of each will thus be gradually increased from the edge 14 thereof to the full body area of the stock. As shown in Figs. 1 and 3, the surfaces of the ends 11 and 12 may be slightly stepped or serrated if desired. Such steps or serrations may be formed by specially designed cutting off tools or otherwise, as hereinafter described.

The link blank 20 shown in Figs. 2 and 4 is substantially the same in form as that shown in Figs. 1 and 3, except that it is provided with ends 21 and 22 which are not stepped as the ends 11 and 12 but which are substantially smooth on their surfaces. These ends, like those of the blank 10, are substantially V-shaped and are positioned so as to lie in the same plane whereby the edges 23 thereof will lie in juxtaposition when the blank is shaped up in the form of a link, as shown in Fig. 6. These edges, likewise, will lie in a plane at right angles to a plane passing through or parallel with the side surface of the link.

The substantially V-shaped ends of my link blanks may be made in any one of a number of well-known ways, as, for instance, machining, grinding, forging, or shearing. Since the stock from which such blanks are made is usually fed to the chain link forming machine, and since blanks for the ordinary link are usually sheared during their feed to such machine, it is preferable to form my link blanks by shearing. This may be done by any suitable mechanism, and in Fig. 5 I have shown in a somewhat diagrammatic manner a device which can be used for this purpose. As here shown, 25 is the bed of the machine which is provided with a front wire or rod guide 26 and a rear wire or rod guide 27. Positioned between these two guides are two oppositely arranged tool heads 28 and 29. These tool heads may be slidably mounted in the body or they may be mounted so as to oscillate. Their mode of operation is, however, immaterial so long as they are brought toward each other when shearing the stock 30 and moved away from each other when the stock is again to be fed through the guides. Each of these tool heads 28 and 29 carries a shearing tool 31. Each of these tools is suitably secured in its respective tool head by means of a set screw 32, and adjustment is provided by means of an adjusting screw 33, which is preferably carried by the tool head 29 and engageable with the end of the tool 31 carried by this head. The other tool 31 is preferably held in fixed relation with the tool head by engagement with a suitable shoulder formed in the head.

The front wire guide 26 is preferably provided with a bell-shaped mouth 35 and serves to support the wire or rod 30 as it is fed to the cut-off machine. This guide is held in place preferably by means of a set screw 36 which engages an annular recess 37 formed in the guide. The rear guide 27 may be held in place by means of a clamping plate 38 which engages with a suitable notch 39 formed in this guide. A suitable friction means 40 is preferably provided for the cut off blank so as to frictionally hold it within the rear guide 27, and this frictional means is of the type usually employed in chain forming machines and is, therefore, not shown or described in detail. It may be carried by a plate 41 which is suitably secured to the guide 27.

As shown in the apparatus of Fig. 5, the cut-off tools 31 are each formed with a stepped working face which produces the stepped V-shaped ends 11 and 12 of the form of invention shown in Figs. 1 and 3. Where it is desired to form the blank of Fig. 2, these tools are replaced by others having smooth cutting edges. Obviously, the tools are so adjusted in relation to each other that their extreme cutting edges lie in juxtaposition and in a plane which is substantially at right angles to a plane passing through the axis of the blank.

The apparatus shown in Fig. 5 when used for the production of my blank, is made a part of the chain link forming machine and replaces the usual cut-off mechanism of that machine.

In the foregoing specification and in the appended claims where I use the term "high carbon and alloy steels", I mean steels having a carbon content of from .07% to .20%, and containing nickel, molybdenum, chrome, or manganese, in suitable combination, as, for example, molybdenum nickel, manganese chrome, or chrome nickel.

Having thus described my invention, what I claim is:

1. As an article of manufacture, a link blank of substantially round cross-section made from high-carbon and alloy steel, having V-shaped ends, the edges of the ends being so arranged as to lie in substantially the same longitudinal plane and in a plane substantially coincident with the central axis of the blank, so that when the blank is shaped in the form of a link, the edges will contact with each other, whereby the link may be welded from a central area oppositely from the initial abutting surfaces without the formation of pockets.

2. As an article of manufacture, a link blank of substantially round cross-section made from high-carbon and alloy steel, having V-shaped ends, the edges of the ends being so arranged as to lie in substantially the same longitudinal plane and in a plane substantially coincident with the central axis of the blank, so that when the blank is shaped in the form of a link, the edges will contact with each other, said edges lying in a plane at substantially right angles to a plane parallel with the side surface of the link, whereby the link may be welded from a central area oppositely from the initial abutting surfaces without the formation of pockets.

FRANK E. STAHL.